United States Patent [19]

Benedetti

[11] 4,123,819

[45] Nov. 7, 1978

[54] BI-DIRECTIONAL RE-ENTERING WHEEL FOR FIXED AND EXTENDIBLE TROLLEYS AND FEET

[75] Inventor: Stefano Benedetti, Rome, Italy

[73] Assignee: Leonardo Cassale, Long Island City, N.Y.; a part interest

[21] Appl. No.: 825,054

[22] Filed: Aug. 16, 1977

[30] Foreign Application Priority Data

Nov. 15, 1976 [IT] Italy ............................... 52177 A/76

[51] Int. Cl.² ............................................. B60B 33/08
[52] U.S. Cl. .................................. 16/24; 280/47.13 R
[58] Field of Search ........................................ 16/24–28, 16/31 R, 46, 33; 280/43.24, 47.13 R, 79.1 R, 79.1 A, 35

[56] References Cited

U.S. PATENT DOCUMENTS

| 1,542,231 | 6/1925 | Garfield | 16/24 |
| 2,472,952 | 6/1949 | Lennard | 280/79.1 A X |
| 2,659,926 | 11/1953 | Wein | 16/24 |
| 3,445,882 | 5/1969 | Miano | 16/26 X |

FOREIGN PATENT DOCUMENTS

| 424,014 | 8/1947 | Italy | 16/33 |
| 550,039 | 10/1956 | Italy | 280/47.13 R |

*Primary Examiner*—Dorsey Newton
*Attorney, Agent, or Firm*—Richard L. Miller

[57] ABSTRACT

A caster or dolly for placement under a heavy object that is intended to be moved across a floor or other surface; the dolly including a spring-loaded, telescopic arm which at each opposite end is supported upon a rotatable roller mounted on an axle that can selectively be placed so that both axles are either parallel or else arially aligned in order that the dolly can travel in either of two directions at right angle to each other, and each roller being vertically adjustable between an operative and an inoperative position by means of a rotatable cam resting upon the opposite ends of each axle.

1 Claim, 5 Drawing Figures

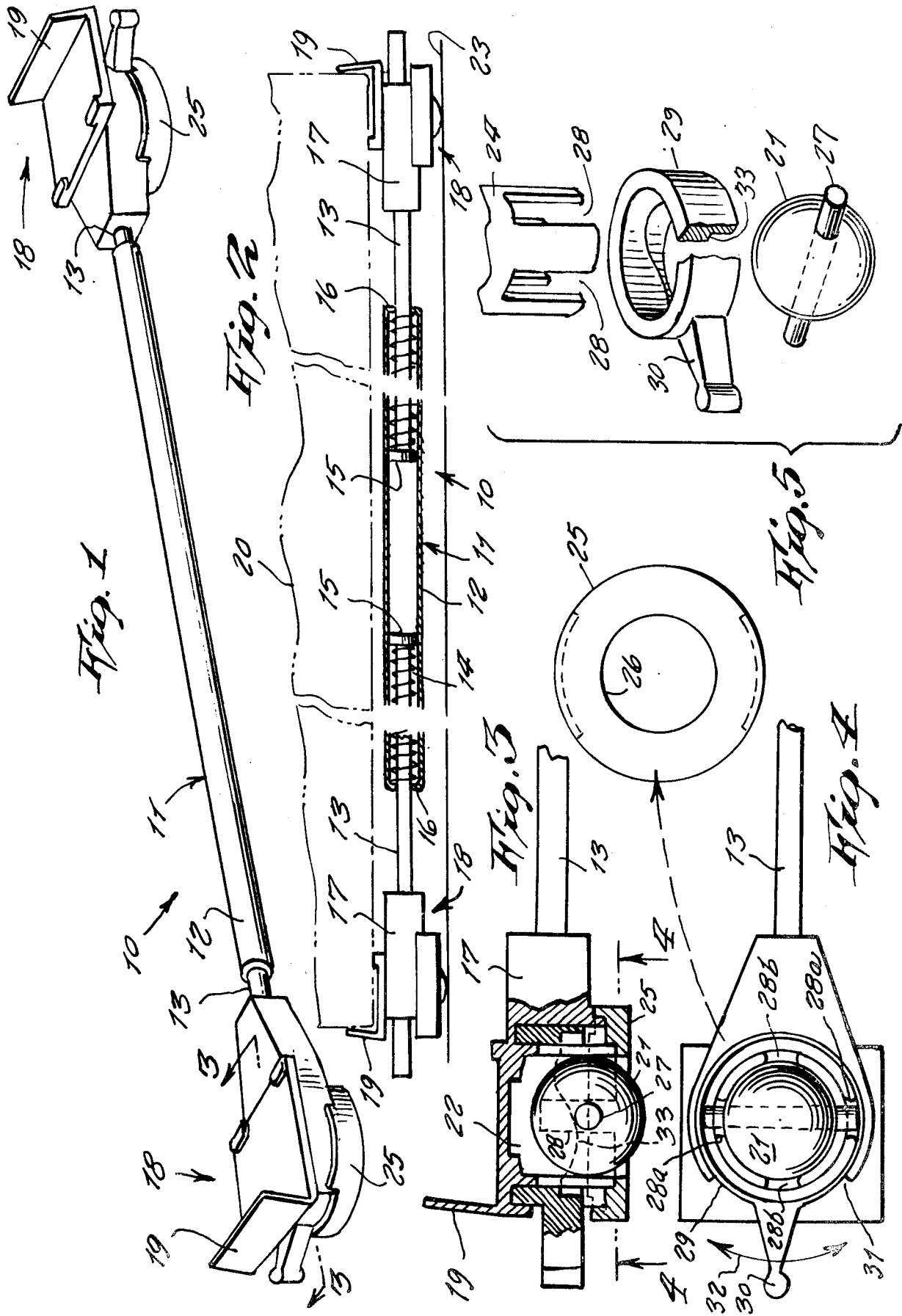

BI-DIRECTIONAL RE-ENTERING WHEEL FOR FIXED AND EXTENDIBLE TROLLEYS AND FEET

This invention relates generally to dollies or casters. A principal object of the present invention is to provide a caster unit designed like a dolly, and which can snap-fit under a heavy object that is to be movable across a flat surface, the unit including rollers that are retractable so that when the unit is not used to move the object from place to place, the unit, attached to the underside of the object, will keep the object stationary from moving.

Another object is to provide a caster unit which accordingly can be fitted under either furniture, machines or other heavy objects that might require being relocated in position.

Another object is to provide a caster unit which includes a caster roller at opposite ends of a spring-loaded, telescopic arm so that the unit will readily and easily snap on the underside of a heavy article.

Yet another object is to provide a caster unit which is very small so to be readily portable and which is unobtrusive in appearance as well as size.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a top perspective view of the invention.

FIG. 2 is a side view thereof shown supporting an object thereupon.

FIG. 3 is an enlarged side cross section on line 3—3 of FIG. 1.

FIG. 4 is a bottom view on line 4—4 of FIG. 3 shown with bottom cap removed.

FIG. 5 is an exploded perspective view of a typical roller unit.

Referring now to the drawing in detail, a caster unit 10 includes a telescoping arm 11 compressed on tube 12 having a rod 13 slidable in each opposite end thereof. A compression coil spring 14 between and enlarged head 15 of each rod and an inward flange 16 on each end of the tube normally urges the arm to contract together. The opposite end of each rod is held rotatably free in a housing 17 of a caster 18, the housing including an upwardly inclined plate 19 for bearing against a side of an item of furniture or other object 20 that is placed upon the caster unit 10, as shown in FIG. 2.

Each caster 18 includes a spherical roller 21 that is contained inside a cavity 22 on the underside of the housing 17 the roller being made of steel, plastic or other suitable material and serving a travel upon the floor or other surface 23. The cavity 22 is formed by a downward cylindrical wall 24 integral with the housing and which surrounds the cavity thus formed thereby. The roller is prevented from dropping out of the bottom of the cavity by means of a bezel or cap 25 that snap fits around a lower end of the housing; the bezel having a circular central opening 26 through which the roller can protrude downwardly in order to engage the floor surface 23.

In the present invention the rollers are not free to rotate in a universal direction so that the unit 10 cannot travel into any horizontal direction. Instead, the unit is made so as to travel only either in direction that is parallel to an axis of the arm or else in a direction that is transverse thereto.

This is accomplished by means of each roller being mounted on a steel axle or shaft 27 that extends from each opposite side of the roller. The cylindrical wall 24 has four equally spaced apart slots 28 extending from a lower edge so that the shaft 27 can fit into two opposite slots. Two opposite slots are along the longitudinal axis of the arm 11 while the other two opposite slots are along a line transverse thereto. Thus it will be readily evident that where the roller shaft 27 is fitted in the slots 28a (as shown in FIG. 4), the roller can then travel only in a straight direction that is parallel to the axis of arm 11. When the bezel is removed, and the roller is dropped out of the cavity, and is re-inserted so that the shaft 27 extends into slots 28b, the roller can then travel only in a direction transverse to the arm axis. Thus the unit is readily adjustable so to travel in either direction as desired.

The present invention incorporates means whereby the rollers can be selectively retracted into the cavity when the unit is not intended to be used in moving the object 20 from place to place. Thus the object may be held stationary while the unit 10 remains fitted on the bottom thereof.

This is accomplished by a rotatable collar 29 fitted around the outer side of cylindrical wall 24, the collar having an extending handle 30 integral therewith for manual operation to flip the handle toward opposite ends of a notch 31 of the housing as shown by double headed arrow 32. The collar has a bottom cam face 33 around an inner side of the cam's central opening, and the opposite ends of the roller shaft, extending through the slots 28 are sufficiently long so to additionally extend to travel on the underside of the cam face, as clearly shown in FIG. 3. The cam face is contoured in a vertical direction so that when the handle 30 is flipped toward one end of the notch 31, the roller is extended downwardly out of the bezel so to travel on the floor. When the handle is flipped to the notch's other end, the shaft 27 rides against a higher surface of the cam face so that the roller is thus retracted into the cavity.

It is to be noted that the casters 18 independently of each other can rotate about the axis of the arm. Thus during travel the unit can accomodate itself to floor surfaces that may be wavy.

While certain novel features of this invention have been shown and described and are pointed out in the annexed claims, it will be understood that various omissions, substitutions and changes in the forms and details of the device illustrated and in its operation can be made by those skilled in the art without departing from the spirit of the inventon.

I claim:

1. A caster unit, comprising in combination, a spring-loaded, telescopic arm, a caster at each opposite end of said arm, each said caster including a housing having an upward plate for fitting around opposite sides of an object placed upon said caster unit, and each said caster including a spherical roller for traveling on a floor surface; said housing having a downward cylindrical wall around a central cavity receiving said roller, said cylindrical wall having four equidistant apart notches along a lower edge thereof, said roller being mounted on a center of a straight shaft, opposite ends of said shaft fitting into either pair of opposite of said notches; a bottom cap being fitted on a lower end of each said caster housing, a central opening through said cap allowing said roller to protrude downward therethrough; a collar being rotatably fitted around said cylindrical wall, a handle integral with said collar extending sidewardly, a cam face on an underside of said collar having said shaft ends rest thereagainst, said cam face being contoured so that in one pivoted position of said collar the said roller is upwardly retractable inside said cavity, in an opposite pivoted position of said collar the said roller is downwardly advanced outward of said cavity.

* * * * *